PROXIMITY FUSE WITH TWO OSCILLATORS

Filed March 11, 1946

Inventor,
Robert D. Huntoon

By J. H. Church & W. E. Thibodeau
Attorneys

United States Patent Office 3,123,821
Patented Mar. 3, 1964

3,123,821
PROXIMITY FUSE WITH TWO OSCILLATORS

Robert D. Huntoon, Silver Spring, Md., assignor to the United States of America as represented by the Secretary of the Army Filed Mar. 11, 1946, Ser. No. 653,697
3 Claims. (Cl. 343—7)
(Granted under Title 35, U.S. Code (1952), sec. 266)

The invention described herein may be manufactured and used by or for the Government for governmental purposes, without the payment to me of any royalty thereon.

The invention relates to an electrical control circuit and particularly to suppression of microphonic response in such circuits.

In various radio fuze applications, considerable trouble is encountered with microphonics or variation of circuit components, particularly capacity changes, due to vibration of the antenna. These microphonic or noise voltages are especially undesirable or even harmful in cases where very small or critical voltages or currents are involved as in the case of electrical proximity fuzes or electrically operated controls for bombs, shells, rockets or the like. It is an object therefore to provide a circuit that can be used in various applications to minimize the effects of external microphonic voltages developed by vibrations outside the fuze structure, in the antenna structure.

A further object is to provide a circuit that will be responsive to load changes but not to microphonic capacity changes such as those due to vibration.

The specific nature of the invention as well as other objects and advantages thereof will clearly appear from a description of a preferred embodiment as shown in the accompanying drawings, in which.

Figure 1:
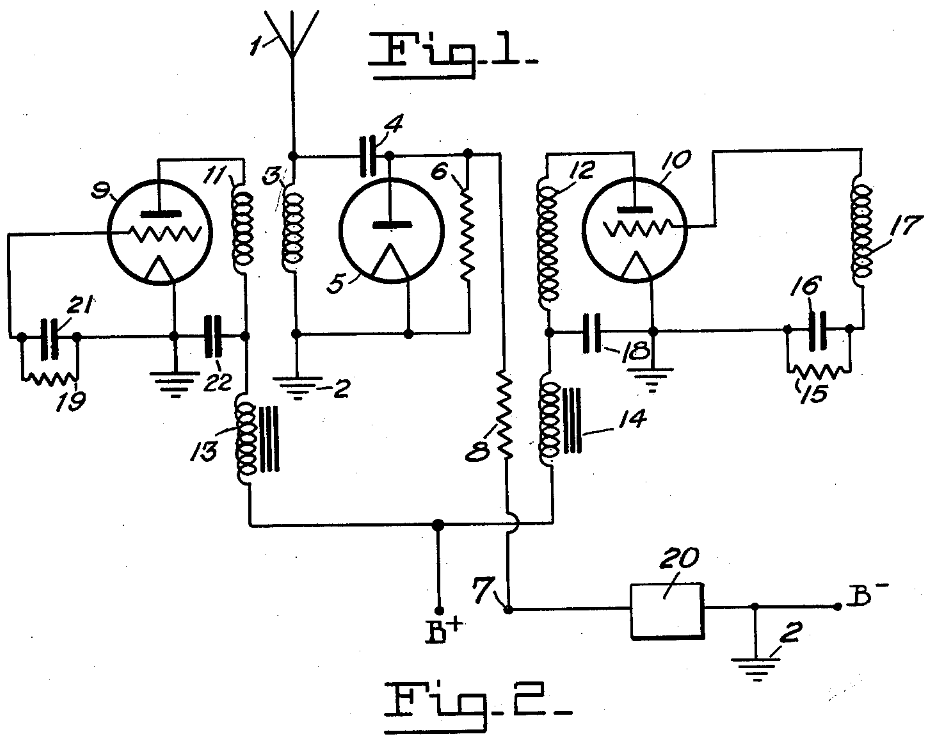
FIGURE 1 is a diagram of an improved circuit, showing two oscillators and a coupled diode circuit.

In FIGURE 1 there is shown what is commonly referred to as a "trans-ceiver" circuit comprising an antenna 1, which may be the nose cap of a radio fuze or any suitable attachment to a projectile, constituting a resonant antenna circuit connected to ground 2, which may be the body of the projectile, through inductance 3. This inductance is connected in a series circuit including condenser 4 and diode 5 which has load resistance 6 connected between the plate of the diode and ground 2. Variations of diode plate potential, of audio frequency or otherwise, are led to a suitable operating circuit or controlled device 20 through conductor 7 which may have resistance or impedance 8 in series.

Oscillators 9 and 10 are coupled to inductance 3 by means of plate-connected inductances 11 and 12 respectively. Both of the oscillator plates are supplied with potential from the same B+ source, through the respective chokes 13 and 14 connected as indicated.

Included in the grid circuit of oscillator 10 is a grid leak 15 in parallel with a condenser 16 and such grid leak and condenser are connected in series with an inductance 17. In the filament circuit of oscillator 10 there is included in series therewith a condenser 18.

In the grid circuit of oscillator 9 in series therewith there is included a grid leak 19 in parallel with a condenser 21. A condenser 22 is included in series with the filament circuit of oscillator 9.

In operation, one oscillator is adjusted to produce a definite frequency and the other oscillator is arranged to operate at a slightly different frequency, sufficiently separated however to keep the two oscillators from locking together at a common frequency. The frequency separation should not, however, be far enough to produce a double peaked tuning curve. The frequency response characteristics of the circuit of the controlled device 20 of course should be selected so that such device is not responsive to either of the different frequencies of the two oscillators.

When the described circuit is utilized in proximity fuze applications, the antenna radiates both generated frequencies as the projectile travels along. When the radiated waves strike a target object they are reflected back to the antenna and a standing wave is produced. That is, both of the transmitted frequencies are in effect modulated by a relatively low frequency which is determined by the speed of the projectile. As the projectile approaches its target, the amplitude of such modulating voltage increases sharply and the detection action of diode 5 is applied to the controlled device 20 to operate such.

Figure 2:
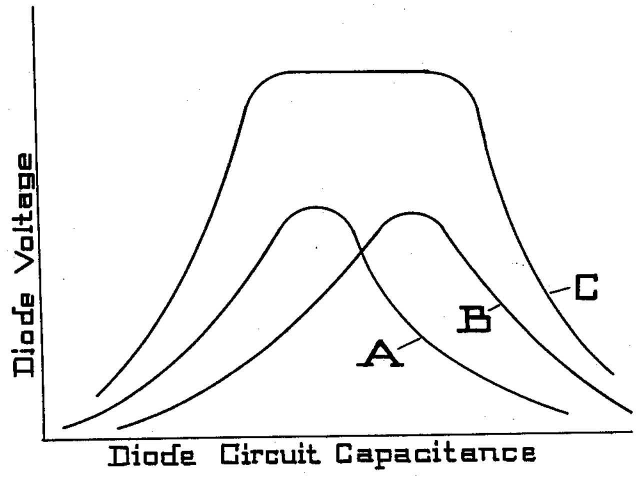
FIGURE 2 shows diode voltage-capacity curves for the two oscillators separately, and a resultant curve when both oscillators are coupled to a diode.

FIGURE 2 shows curves of diode voltage vs. capacitance in the diode circuit; curves A and B for each oscillator separately and curve C when both oscillators are operating at different frequencies. This graph illustrates that the resultant curve C has a substantially flat top so that capacity changes, within limits, can occur in the circuit without affecting the diode voltage. This, of course, is due to the fact that any particular capacity change produces an increase in voltage of one frequency impressed on diode 5 and a decrease in voltage of the other frequency. If therefore the circuit is tuned to correspond with the flat portion of the curve, only load changes reflected from the antenna circuit will give rise to signals and accordingly, response to microphonic changes will be greatly reduced.

The principles which have been disclosed can obviously be applied in many different devices.

I claim:

1. In an electrical control circuit having a coupled diode rectifying circuit, a first oscillator means for generating a first frequency, a second oscillator means for generating a second frequency differing from said first frequency, an antenna coupled to both said first and second oscillator means, said coupled diode rectifying circuit connected to said antenna, and a controlled device connected across said coupled diode rectifying circuit, said first frequency differing from said second frequency by an amount sufficient to prevent locking of said first and second oscillator means but less than that producing a double peaked tuning curve of said first and second oscillator means relative to variations of capacity of said antenna and said coupled diode rectifying circuit.

2. A trans-ceiver comprising a rectifier element, a first radio frequency generating means, and a second radio frequency generating means, an antenna connected to said rectifier element, each of said radio frequency generating means coupled to said rectifier element and arranged to oscillate at different but closely spaced frequencies, one of said radio frequency generating means functioning to produce an increase in voltage impressed upon the rectifier element and the other of said radio frequency generating means functioning to produce a decrease in voltage impressed upon the rectifier element when capacitance variations in the circuit of said transceiver occur and thereby provide the rectifier element with a constant voltage during the period of said variations.

3. In a radio fuse, an antenna, a diode rectifier means having a tuned input circuit, a first radio frequency oscillator inductively coupled to said tuned input circuit, a second radio frequency oscillator inductively coupled to said tuned input circuit, said radio frequency oscillators generating radio frequency energy at frequencies adjacent to each other and thereby providing the diode rectifier means with a constant voltage over a predetermined range of antenna capacitance variations.

References Cited in the file of this patent

UNITED STATES PATENTS

| | | |
|---|---|---|
| 2,162,901 | Van Dyck | June 20, 1939 |
| 2,392,672 | Koch | Jan. 8, 1946 |